US009552029B2

(12) United States Patent
Vaum et al.

(10) Patent No.: US 9,552,029 B2
(45) Date of Patent: Jan. 24, 2017

(54) MICRO GRID POWER DISTRIBUTION UNIT

(71) Applicant: Engineered Electric Company, Bridgeport, CT (US)

(72) Inventors: Christopher J. Vaum, Wilton, CT (US); Gene Frohman, Woodbridge, CT (US); John Petsche, Bridgeport, CT (US); Jason Deguzis, Bridgeport, CT (US); Mike Santella, Bridgeport, CT (US)

(73) Assignee: ENGINEERED ELECTRIC COMPANY, Bridgeport, CT (US)

( * ) Notice: Subject to any disclaimer, the term of this patent is extended or adjusted under 35 U.S.C. 154(b) by 635 days.

(21) Appl. No.: 13/772,229

(22) Filed: Feb. 20, 2013

(65) Prior Publication Data
US 2013/0238151 A1    Sep. 12, 2013

Related U.S. Application Data

(60) Provisional application No. 61/600,987, filed on Feb. 20, 2012, provisional application No. 61/600,986,
(Continued)

(51) Int. Cl.
*G06F 19/00* (2011.01)
*G06F 1/28* (2006.01)
(Continued)

(52) U.S. Cl.
CPC ............. *G06F 1/28* (2013.01); *G05B 15/00* (2013.01); *H02J 3/06* (2013.01); *H02J 3/14* (2013.01);
(Continued)

(58) Field of Classification Search
USPC ............ 700/286, 287, 290, 291; 307/20, 21
See application file for complete search history.

(56) References Cited

U.S. PATENT DOCUMENTS 3,497,711 A    2/1970 Wuttig
3,506,900 A    4/1970 Neuffer et al.
(Continued)

FOREIGN PATENT DOCUMENTS

CN         1090627 A     8/1994
CN       101047317 A    10/2007
(Continued)

OTHER PUBLICATIONS

International Search Report and Written Opinion mailed Jun. 27, 2013, in International Patent Application No. PCT/US2013/026956, filed Feb. 20, 2013, 10 pages.
(Continued)

*Primary Examiner* — Kidest Bahta
(74) *Attorney, Agent, or Firm* — Kilpatrick Townsend & Stockton LLP

(57) ABSTRACT

The techniques described herein include for forming a power grid array with multiple power generators coupled to a power distribution unit. The power distribution unit is adapted to monitor operational data from each of the power generators to perform load balancing among the generators and to optimize the performance of the power grid array. A microgrid network is also provided within the power grid array to enable communication among the power distribution unit and the multiple generators in the array. This communication facilitates monitoring of the power grid as well as receiving and storing the operational data from each of the generators in the grid. The microgrid network can then be used to communicate the operational data over one or more connected networks allowing users to remotely access the power grid and to monitor and control the operational characteristics of the generators.

20 Claims, 9 Drawing Sheets

Related U.S. Application Data filed on Feb. 20, 2012, provisional application No. 13/400,532, filed on Feb. 20, 2012.

(51) Int. Cl.
| | |
|---|---|
| *G05B 15/00* | (2006.01) |
| *H02J 3/14* | (2006.01) |
| *H02J 3/06* | (2006.01) |
| *H02J 3/38* | (2006.01) |

(52) U.S. Cl.
CPC .............. *H02J 3/38* (2013.01); *Y02B 70/3225* (2013.01); *Y04S 20/222* (2013.01)

(56) References Cited

U.S. PATENT DOCUMENTS

| | | | |
|---|---|---|---|
| 3,665,495 A | 5/1972 | Carter et al. | |
| 3,866,108 A | 2/1975 | Yannone et al. | |
| 4,064,485 A | 12/1977 | Leyde | |
| 4,118,635 A | 10/1978 | Barrett et al. | |
| 4,203,041 A | 5/1980 | Sachs | |
| 4,246,532 A | 1/1981 | Kubo | |
| 4,471,299 A | 9/1984 | Elmis | |
| 4,488,198 A * | 12/1984 | Christen | H02H 7/062 307/20 |
| 4,524,288 A | 6/1985 | Schimmelpennink et al. | |
| 5,175,441 A | 12/1992 | Den Hollander | |
| 5,936,318 A * | 8/1999 | Weiler | H02J 4/00 307/18 |
| 6,047,104 A | 4/2000 | Cheng | |
| 6,104,171 A | 8/2000 | Dvorsky et al. | |
| 6,516,603 B1 | 2/2003 | Urbach et al. | |
| 6,825,575 B1 | 11/2004 | Edelson | |
| 7,432,686 B2 * | 10/2008 | Erdman | F03D 7/0224 290/40 R |
| 7,592,784 B2 * | 9/2009 | Qi | H02P 9/14 290/40 C |
| 7,702,771 B2 | 4/2010 | Ewing et al. | |
| 7,923,853 B2 * | 4/2011 | Lewis | F03D 7/0284 290/44 |
| 8,407,016 B2 * | 3/2013 | Slota | H02J 3/42 700/286 |
| 8,605,091 B2 | 12/2013 | Bradbury et al. | |
| 2002/0001204 A1 | 1/2002 | Lentini et al. | |
| 2002/0036430 A1 * | 3/2002 | Welches | F02G 1/043 307/18 |
| 2002/0125869 A1 | 9/2002 | Groom et al. | |
| 2002/0190526 A1 | 12/2002 | Kern et al. | |
| 2003/0133238 A1 * | 7/2003 | Reedy | H02H 7/262 361/62 |
| 2003/0158632 A1 * | 8/2003 | Nierlich et al. | 700/295 |
| 2004/0212273 A1 | 10/2004 | Gould | |
| 2005/0116474 A1 | 6/2005 | Edelson | |
| 2005/0184589 A1 * | 8/2005 | Fujita | B63J 3/04 307/19 |
| 2005/0188745 A1 | 9/2005 | Staphanos et al. | |
| 2005/0207081 A1 * | 9/2005 | Ying | 361/105 |
| 2006/0127710 A1 | 6/2006 | Schulte | |
| 2006/0291820 A1 | 12/2006 | Kobayashi | |
| 2007/0013191 A1 | 1/2007 | Kleen | |
| 2008/0234871 A1 * | 9/2008 | Yamada et al. | 700/286 |
| 2008/0278000 A1 * | 11/2008 | Capp et al. | 307/21 |
| 2009/0055031 A1 | 2/2009 | Slota et al. | |
| 2009/0079266 A1 * | 3/2009 | McNamara | H02J 3/005 307/64 |
| 2009/0108676 A1 | 4/2009 | Algrain | |
| 2009/0187344 A1 | 7/2009 | Brancaccio et al. | |
| 2009/0261599 A1 | 10/2009 | Alston et al. | |
| 2009/0281674 A1 | 11/2009 | Taft | |
| 2010/0052429 A1 * | 3/2010 | Nethery, III | H02H 3/003 307/85 |
| 2010/0141669 A1 | 6/2010 | Sadahiro | |
| 2010/0148579 A1 * | 6/2010 | Maloney | 307/20 |
| 2010/0156117 A1 | 6/2010 | Allen | |
| 2010/0270864 A1 | 10/2010 | Vyas et al. | |
| 2010/0274407 A1 | 10/2010 | Creed | |
| 2011/0130982 A1 * | 6/2011 | Haag et al. | 702/62 |
| 2011/0163603 A1 | 7/2011 | Chou et al. | |
| 2011/0278853 A1 | 11/2011 | Capp et al. | |
| 2012/0029897 A1 * | 2/2012 | Cherian | H02J 3/00 703/18 |
| 2012/0187770 A1 * | 7/2012 | Slota et al. | 307/87 |
| 2012/0236471 A1 | 9/2012 | Vinken et al. | |
| 2013/0076140 A1 * | 3/2013 | Darden et al. | 307/64 |
| 2013/0187452 A1 * | 7/2013 | Dickey | H02M 3/33569 307/18 |
| 2013/0214602 A1 | 8/2013 | Frohman et al. | |
| 2013/0238150 A1 | 9/2013 | Vaum et al. | |

FOREIGN PATENT DOCUMENTS

| | | |
|---|---|---|
| CN | 101335497 A | 12/2008 |
| CN | 101404476 A | 4/2009 |
| CN | 101635483 A | 1/2010 |
| CN | 101662249 A | 3/2010 |
| EP | 898352 A1 | 2/1999 |
| GB | 234924 A | 6/1925 |
| GB | 319072 A | 9/1929 |
| GB | 856732 A | 2/1957 |
| GB | 1146033 A1 | 3/1969 |
| GB | 1533502 A | 11/1978 |
| GB | 2439981 B | 7/2008 |
| IE | S84416 | 11/2006 |
| IE | 85282 | 7/2009 |
| JP | 04-334999 A | 11/1992 |
| JP | 2003-319696 A | 11/2003 |
| KR | 20100048429 A | 5/2005 |
| KR | 10-2011-003488 A | 4/2011 |
| KR | 10-2011-0034510 A | 4/2011 |
| WO | WO2005096492 A1 | 10/2005 |

OTHER PUBLICATIONS

International Search Report and Written Opinion mailed Jun. 27, 2013, in International Patent Application No. PCT/US2013/026959, filed Feb. 20, 2013, 11 pages.

Non-Final Office Action for U.S. Appl. No. 13/400,532 mailed Jan. 23, 2015, 12 pages.

"PowerCommand® digital control technology," product literature Cummins Power Generation Inc. (2007).

Generator set control PowerCommand® Sync1320 product literature Cummins Power Generation Inc. (2007).

"Introduction of generator set Synchronize System," technical article from Emac International Ltd. (Jun. 29, 2011).

"Tactical Micro Grid Controller®," product literature Energy Technologies, Inc. (2000).

U.S. Appl. No. 13/772,218, Non-Final Office Action mailed on Jul. 27, 2015, 13 pages.

Final Office Action mailed Jan. 26, 2016 in U.S. Appl. No. 13/772,218, 14 pages.

U.S. Appl. No. 13/772,218, Non-Final Office Action mailed Apr. 29, 2016, 14 pages.

\* cited by examiner

MICRO GRID POWER DISTRIBUTION UNIT

CROSS-REFERENCES TO RELATED APPLICATIONS

This application claims priority to (1) U.S. Provisional Patent Application No. 61/600,987, filed Feb. 20, 2012, entitled "POWER DISTRIBUTION UNIT FOR POWER GRID MANAGEMENT", (2) U.S. Provisional Patent Application No. 61/600,986, filed Feb. 20, 2012, entitled "REMOTE MONITORING AND CONTROL IN A POWER GRID", and (3) U.S. patent application Ser. No. 13/400,532, filed Feb. 20, 2012, entitled "METHOD AND SYSTEM FOR GENERATOR CONTROL", the disclosures of which are each incorporated by reference herein in their entirety.

In addition, the following U.S. patent applications (including this one) are being filed concurrently, and the entire disclosures of each is incorporated by reference in their entirety into this application for all purposes: (1) application Ser. No. 13/772,218, filed Feb. 20, 2013, entitled "POWER GRID REMOTE ACCESS"; and (2) application Ser. No. 13/772,229, filed Feb. 20, 2013, entitled "MICRO GRID POWER DISTRIBUTION UNIT".

FIELD OF THE INVENTION

The embodiments described herein relate generally to power generator systems. More particularly, the embodiments relate to forming a power grid array of multiple power generators coupled with a power distribution unit.

BACKGROUND

A micro-grid (or "microgrid") is a localized grouping of electricity generators, energy storage, and electrical loads that normally operate connected to a traditional centralized grid ("macrogrid"). Power generation and the electrical loads in a microgrid are usually interconnected at low voltage. From the point of view of the grid operator, a connected microgrid can be controlled as if it was one entity. Microgrid generation resources can include fuel cells, wind, solar, or other energy sources, including local power generators. The multiple dispersed generation sources and ability to isolate the microgrid from a larger network can provide highly reliable electric power.

Power grid systems generally require load profile data including the operating characteristics of all of the power generators connected to the grid to be gathered and analyzed to optimize the microgrid's configuration. But, heretofore, during normal operation of microgrids, information about the load characteristics and generator performance is not normally available without connecting it with external equipment and custom software. In addition, conventional generators typically include a display to observe performance characteristics, fault conditions, oil pressure data, and the like; however, the data is never stored anywhere so it is lost when the generator is shut down or a user clears the fault or warning conditions.

In addition, microgrids are more fuel efficient than standalone or parallel generator systems and they provide a robust, redundant power source. But microgrids are generally more complex. As a result, conventional microgrid systems require that entire networks (e.g., micro-grid arrays) be shut down to disconnect one generator from the grid for servicing.

SUMMARY

Embodiments described herein include systems, methods, and apparatuses for forming a power grid array comprising multiple power generators coupled together with a power distribution unit such that the operational data from each of the power generators can be monitored and the performance of the power grid can be optimized. In one embodiment, this is accomplished using a computer built into the power distribution unit. This operational data can then be stored and accessed later for analysis to optimize the power grid array's configuration. The operational data of the generators in the power grid can be used to perform load balancing among the generators to coordinate the amount of power each of the generators should contribute to the electrical load. For instance, the operational data can be used to automatically shut down one or more of the connected generators to conserve fuel or to accommodate a changing electrical load profile. In addition, the power output lines from each of the plurality of generators in the power grid array can be coupled together using a load sharing cable to drive the overall electrical load of the power grid. In one embodiment, a safety wire is embedded into each of the power output lines of the generators to ensure that each generator connected thereto is disabled when it is shut down.

Embodiments described herein are also adapted to form a microgrid network within the power grid array that provides a means of communication among the power distribution unit's computer and the multiple generators in the array. This communication facilitates monitoring of the power grid as well as receiving and storing the operational data from each of the generators in the grid. The microgrid network can then be used to communicate the operational data over one or more connected networks via a network port coupled with the power distribution unit ("PDU") computer that allows users to remotely access the power grid and to monitor the operational characteristics of the generators. Users can access the microgrid using a data processing device of some kind, such as a laptop computer, tablet, or a mobile communications device. A hardwired connection or a wireless router can be plugged into the network port for remote access. In one embodiment, the network port exposes the operational data as a web server that can be accessed on the Internet. In addition, the network port can be further adapted to receive commands from the user's device over the network for controlling the generators in the grid.

These and other details of embodiments of the invention are described in the following description, claims, and figures.

BRIEF DESCRIPTION OF THE DRAWINGS

A better understanding of at least certain embodiments of the invention can be obtained from the following detailed description in conjunction with the following drawings, in which.

DETAILED DESCRIPTION

Figure 1:
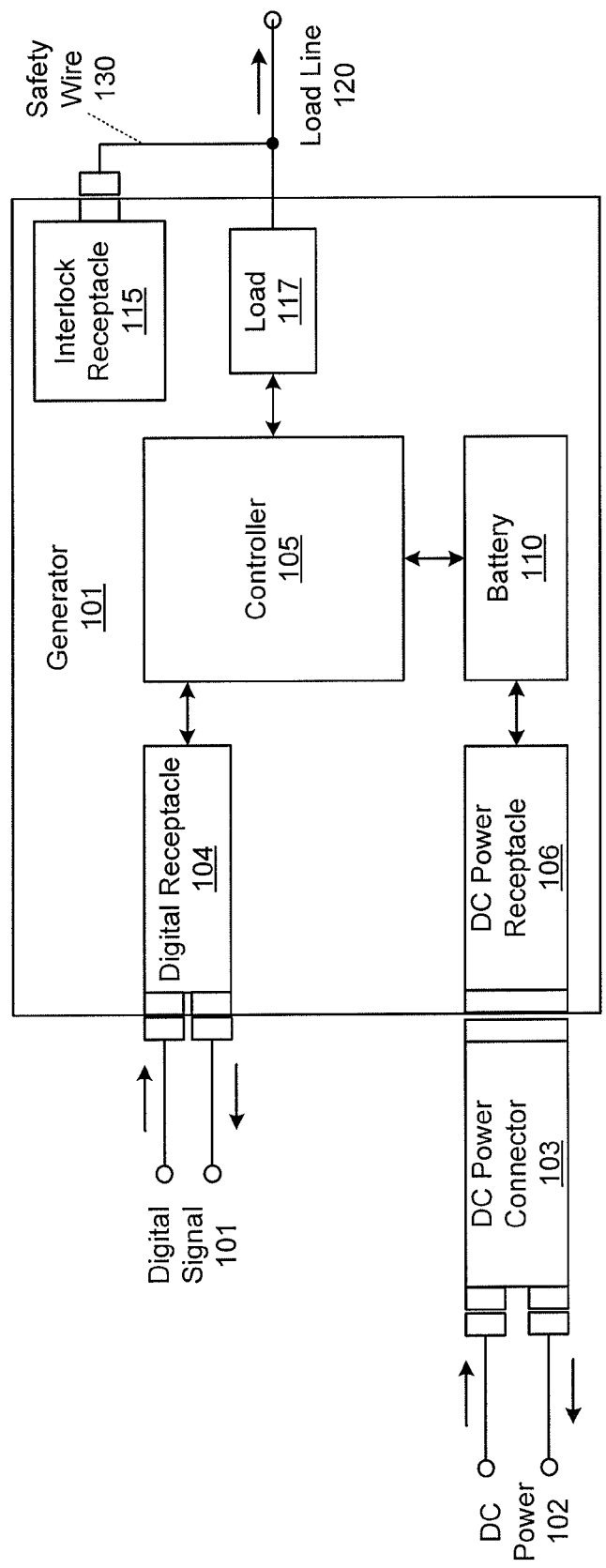
FIG. 1 depicts an example block diagram of a power generator system according to one illustrative embodiment.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

I. Operational Data Collection

The techniques introduced herein are adapted to form a power grid array by coupling together a plurality of power generators with a power distribution unit such that the operational data from each of the power generators can be monitored, analyzed, and optimized. In one embodiment, this is accomplished using a computer built into the power distribution unit. This operational data can then be stored and accessed later for analysis to optimize the microgrid's configuration. The operational data of the generators in the power grid can be used to perform load balancing among the power generators in the grid to coordinate the amount of power each of the generators should contribute to the electrical load. For instance, the data can also be used to automatically shut down one or more of the connected generators to conserve fuel.

The techniques described herein are also adapted to form a microgrid network within the power grid array that provides a means of communication among the power distribution unit's computer and the multiple generators in the array. This communication facilitates monitoring of the power grid as well as receiving and storing the operational data from each of the generators in the grid. The microgrid network can then be used to communicate the operational data to the computer in the power distribution unit as well as over one or more connected networks via a network port coupled with the computer. The microgrid network thus facilitates users to remotely access the power grid using a data processing device of some sort, and to monitor the operational characteristics of the generators.

For instance, users can access the microgrid network using a laptop computer, tablet, or a mobile communications device as examples. Other devices, computers, or data processing devices can be used. A hardwired connection or a wireless router can be plugged into the network port for remote access. In one embodiment, the network port exposes the operational data as a web server that can be accessed on the Internet. In addition, the network port can be further adapted to receive commands from the user's device over the network for controlling the generators in the grid. In at least certain embodiments, the microgrid network is accessed using an Internet Protocol ("IP") address of the power grid array. The computer of the power distribution unit can also be accessed by its IP address.

As described above, the power distribution unit is capable of monitoring all of the generators in the power grid with a single computer (or multiple computers in some embodiments). The power grid data can be monitored remotely by users using various data processing devices (e.g., laptop, PDA, table PC, smart phone, etc.). The power grid data can be shared on a network such as a LAN, WAN, or other network configuration. Users can access a hard drive of the PDU by its IP address and download or view power grid data without preloading any particular software onto the user's device. The data can be in spreadsheet format, document format, or other commercially available or proprietary format. The user can view, download, and manipulate data once access to the PDU is established. Security measures may be implemented as required as would be appreciated by one of ordinary skill in the art. In some cases, the PDU includes a computer that accesses and collects the operational data from one or more of the gensets. In other cases, each of the generators in the grid has a built-in computer that collects and stores the operational data and can communicate and share the data over the microgrid network via a wired or wireless connection. In such cases, a control panel inside each generator can be configured to export the operation data to the PDU.

Certain embodiments incorporate grid monitoring Ethernet connections and automatic data logging using the computer built into the PDU. The monitoring can begin at the time the power grid is brought online. The data logging computer can also detect new generators when they are attached to the grid and can then log data from those additional computers as they are brought online. In certain embodiments, this can be accomplished using an integrated controller area network ("CAN") bus interfaced with a Modbus for the operational data monitoring. The PDU computer can log operational data from connected generators to a solid state disk (or other memory) and can be remotely accessed to view and download the data over a network connection such as an Ethernet connection. The network port (e.g., Ethernet port) can be connected to the user's data processing device over a wired or wireless network. For instance, the user's device can be a tablet PC, laptop, or smart phone application connected via an external wireless router for wireless access to the operational data from a remote location.

FIG. 1 depicts an example block diagram of a power generator system. In the illustrated embodiment, generator 100 includes a controller 105 coupled with a battery 110 to provide DC power 102 to the controller from a DC power connector 103 via a DC power receptacle 106. Controller 105 is further coupled with a digital signal 101 received on a digital signaling cable (not shown) via a digital receptacle 104. In one embodiment, only the amount of DC power 102 necessary to charge the battery 110 that powers the controller 105 is provided for each power generator 101 in the power grid. This is advantageous because power can be conserved within the power grid.

In addition, digital signal 101 coupled with the controller 105 via receptacle 104 is used for data and control signals for communications among and between the generators connected to the power grid as well as the computer at the PDU. The operational data gathered and stored by the controller 105 can be sent to the PDU computer for monitoring and analysis using the digital signaling cable upon which the digital signal 101 is coupled to. In the illustrated embodiment, the controller 105 of generator 101 can be used to couple the power generated by the generator to the load 117 via load line 120. In one embodiment, the load line 120 is referred to as a power output cable of the generator 101. This embodiment further shows that a safety wire 130 coupled with the power output load line 120 of the generator via an interlock receptacle 115. In one embodiment, the safety wire 130 and the power output load line 120 are incorporated into the same cable.

Figure 2:
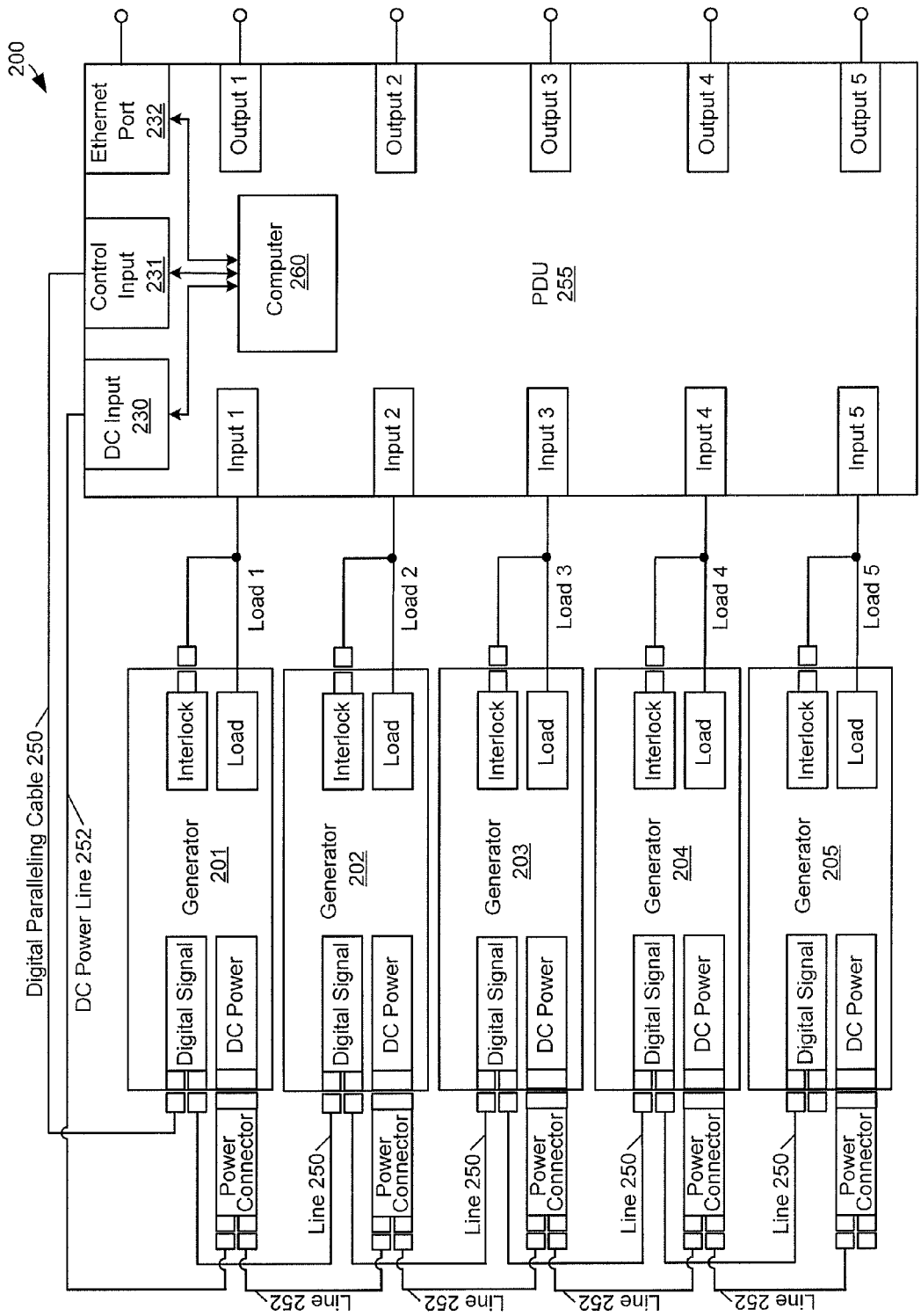
FIG. 2 depicts an example block diagram of a power distribution unit coupled with a plurality of power generators in a power grid array according to one illustrative embodiment.

Multiple of the generators 101 are coupled together with a PDU to form a power grid array. FIG. 2 depicts an example block diagram of a power distribution unit coupled with a plurality of power generators in a power grid array. In the illustrated embodiment, the power grid array includes a plurality of generators 201-205 coupled with inputs 1 through 5 of PDU 255 via power output load cables 1 through 5 respectively. Generators 201-205 each include the components of generator 101 discussed above with respect to FIG. 1. DC power can be coupled to the generators 201-205 via the DC power line 252. As discussed previously, this DC power may be used to charge the batteries of the generators. The DC power over line 252 can also be used to power up the computer 260 onboard the PDU 255 via the DC input 230. Other sources of power are also contemplated within the scope of the techniques described herein. In the illustration, PDU 255 includes a set of outputs 1 through 5, which in at least certain embodiments, are adapted to provide low-level power distribution to end users directly from a plurality of the outputs of the power distribution unit. PDU 255 is configured to provide this low-level without requiring additional PDUs connected at the outputs 1 to 5 as is required in conventional systems.

In addition, the digital signal 101 discussed above can be provided over the digital paralleling cable 250, which is coupled to the digital input of each of the power generators in the power grid as well as to a control input 231 of the PDU 255. This digital signaling cable 250 provides communications within the power grid among the generators 201-205 as well as the computer 260 of the PDU via control input 231. In one embodiment, the digital communications are used to provide the operational data of the generators 201-205 to the PDU for monitoring, storage, and analysis. The computer 260 can then provide the operational data and other characteristic data for the generators in the array via a network port such as Ethernet port 232. In addition, commands can be received from users over a network coupled with the network port 252 to control certain functionality of the generators connected to the power grid. In this manner, a microgrid network can be established within the power grid array such that operational data can be collected, stored, and provided to users over a wired or wireless connection; and likewise, command and control signals can be received from users remotely over one or more connected networks.

Figure 3A:
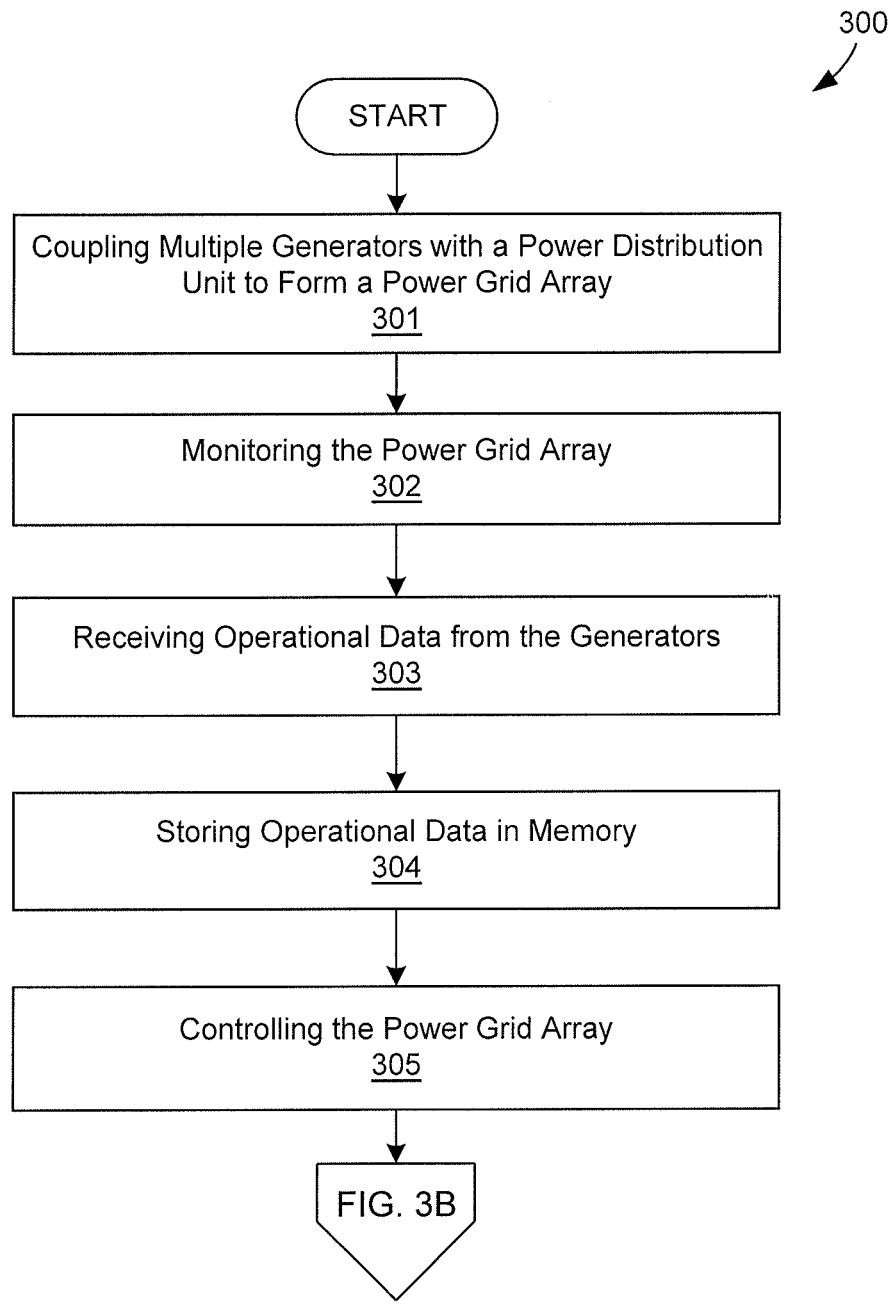
FIG. 3A depicts an example flow chart of a process of monitoring and controlling a power grid array according to one illustrative embodiment.

FIG. 3A depicts an example flow chart of a process of monitoring and controlling a power grid array. In the illustrated embodiment, process 300 begins at operation 301. In that operation, a power grid array is formed by coupling multiple generators together with the power distribution unit of the present disclosure. This allows the computer on the power distribution unit to monitor the power grid array (operation 302) and to receive operational data from the connected generators (operation 303). The operational data can then be stored (operation 304) and used to analyze, optimize, and control the generators in the power grid (operation 305). In one embodiment, the multiple generators can be synchronized automatically using the techniques described herein such that the amount of power contributed by each of the generators can be coordinated to drive an electrical load profile. This operational data can be saved as log files in memory of the computer in the power distribution unit. The operational data can further be used to balance the electrical load among the multiple generators and can be used to determine that one or more of the generators should be shut down to conserve fuel or to adapt to a changing electrical load profile.

Figure 3B:
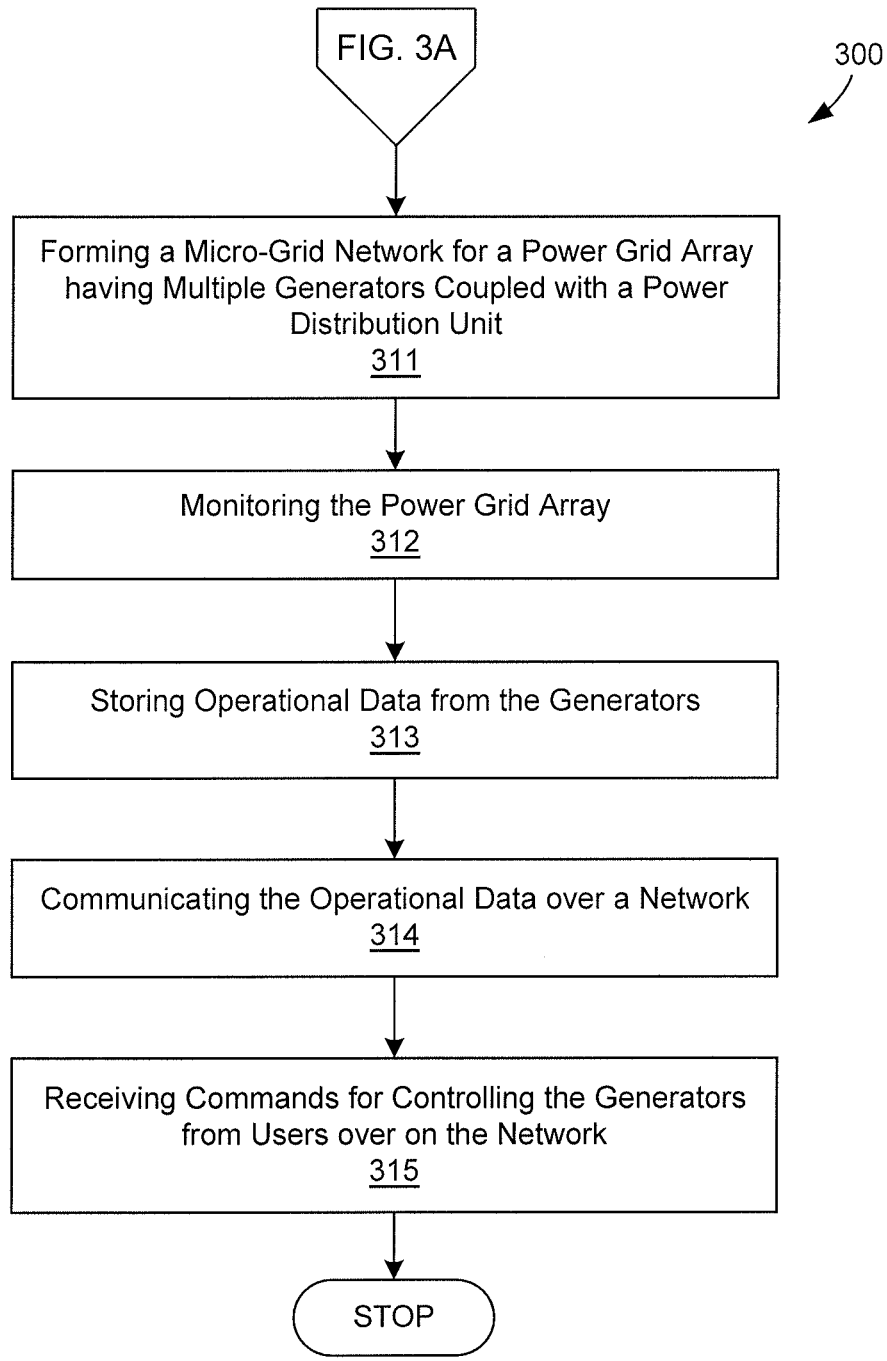
FIG. 3B depicts an example flow chart of a process of forming a microgrid network in a power grid array according to one illustrative embodiment.

Process 300 continues at FIG. 3B, which depicts an example flow chart of a process of forming a microgrid network in a power grid array. In the illustrated embodiment, a microgrid network is formed within the power grid array (operation 311). As above, the power grid array is formed by coupling multiple generators together with the power distribution unit of the present disclosure. This arrangement allows the computer on the power distribution unit to monitor the power grid array (operation 312) and to store operational data received from the connected generators in the power grid (operation 313). Once the operational data is stored at the PDU, it can be communicated over a network (operations 314). At operation 315, commands for controlling the generators in the power grid array can also be received from users over the network using a data processing device coupled with the network.

In one embodiment, this can be done by coupling the microgrid network with a network port configured to communicate over one or more networks. For instance, the network port can be configured to plug into a wireless router to transfer data via Wi-Fi, Bluetooth, or equivalent network. For instance, the network port is an Ethernet port and the communications can be made over the Internet. The network port can be configured to connect to a wired or wireless connection for remote access by a user having a data processing device capable of sending and receiving data over a network. In other embodiments, the microgrid network can be accessed via a wireless network to view or download the operational data wirelessly from a user's device. In at least certain embodiments, the network port exposes the operational data of the microgrid network as a web server that can be accessed over the Internet. The microgrid network can be accessed, for example, using an Internet Protocol ("IP") address associated with the power grid array. In other embodiments, the computer in the PDU can also be accessed by its IP address. Such access to users on a network can be provided in certain embodiments without preloading any specialized software onto the user's device. This completes process 300 according to one example embodiment.

The monitoring tracking capabilities described above can provide a pre-alert of a potential problem prior to generator failure. Statistical analysis of generator usage over time can provide myriad means of improved generator usage in terms of efficiency, diagnostics, preventative maintenance, and the like. To illustrate this method with a practical example, the oil pressure in a generator may be low for six weeks followed by a seized motor. The customer may try to return the generator to the manufacturer for a refund claiming that the generator was defective. With access to the generator operational data, the manufacturer is able to determine that, for example, the customer neglected to address the low oil pressure during the prior six-week period and failed to add any oil, which may be useful to know to establish liability.

In another example, a service person can access data trends over time to determine if there is an oil leak, the generator is burning oil, the water temperature is too high, extra fuel is being burned, or the like. In conventional systems, this type of data is fleeting (e.g., passes in real time) and is then lost. In certain aspects, the generators or PDU can automatically collect this data and provide operational data trends over time to help diagnose potential problems, or to analyze the data offline or at another time.

The service person could also analyze power load profiles over a period of time (e.g., 24 hours) to determine if the generators in the power grid are being properly matched to a given load. In some cases, the generators may be oversized for a small load and thus inefficiently utilized for the particular load profile. In another example, a service person can access a signature of a load profile over several days. This may be useful when a particular load profile is relatively constant on a day-to-day basis, but then there is one particular day that exhibited anomalous results. For example, a generator may provide more current than normal at a military base camp when hot water heaters are powered up in the morning, which may indicate a short or other circuit failure.

With the wireless data transfer capabilities, the PDU can wirelessly interface with common consumer electronic devices (e.g., tablet personal computers, smart phones, etc.) to transfer power grid operational data for remote monitoring. The PDU can include a computer that collects the operational data and stores it in any suitable format. In some cases, the PDU can automatically begin logging all operation data for the power grid at start up. The generators in power grid array can be connected together to share an overall electrical load and to communicate with each other to coordinate how much power each generator should contribute to the load. A load sharing cable (not shown) can connect the generators together, allow them to communicate with each other, and enable tracking and monitoring of the operating or performance characteristics data of the generators such as their oil pressure, water temperature, fuel level, generator voltage output, potential faults or warnings (e.g., voltage spikes, over voltage, under frequency, etc.).

Wireless access to the PDU provides a convenient way to monitor the operation of the power grid remotely from a distance away. As described above, the PDU provides a capability to connect external Ethernet devices, such as a Wi-Fi router, so that the power grid can be on a wireless grid, wireless network, or hardware network, to allow consumer electronic devices (e.g., iPAD™, iPhone™, or the like) to connect to the network and retrieve data. In some embodiments, an application can be downloaded from a onto the user's device. Such an application can enable a user to type in the IP address of the power grid to gain access for monitoring and downloading of power grid data. For example, a user may want a particular generator to run for four (4) hours or the user may want to program the grid such that it automatically selects a particular generator to run based on a number of operating hours it has on it. In another example, the user's device may show that there are three 45 kW generators on the grid and a 10 kW load to calculate power efficiency and usage data. The user's device can be configured to download a log file from the power grid. In some cases, this may be imported into common spread sheet applications (e.g., Excel, Numbers, etc.). Other types of data logs can be exported as well as would be appreciated by one of ordinary skill in the art with the benefit of this disclosure. If a service person wants to troubleshoot a generator in the grid, that person can view what states the generator has gone through and identify where the problem is. This data can be downloaded onto the user's device and reviewed at a later time, or emailed or downloaded to another computer, etc. For example, if a soldier in Afghanistan is on the phone with technical support in the United States, that soldier can email a log file to the support personnel to give them a clear picture of the generator operating history over any desired period of time. As such, there are myriad types of information that the user's device can access in addition to monitoring the grid from anywhere in the vicinity of a network connection such as Wi-Fi. In addition, the user's device can remotely access multiple microgrids provided within wireless range.

All of the operating and performance characteristics can be made accessible on one or more of the generator screens or the PDU, and can be collected, stored, and cataloged at any time by a computer (e.g., the generator controllers or the onboard computer, or the like). Conventional generators typically include a display to observe performance characteristics, fault conditions, oil pressure data, and the like; however, the data is never stored anywhere so it is lost when the generator is shut down or a user clears the fault or warning conditions. As described above, providing a means to collect the generator data for later analysis provides many advantages. The operational data can be accessed via a display on a generator (e.g., on the control panel, on the generator chassis, etc.), on the PDU, or other point on the power grid array.

Figure 4A:
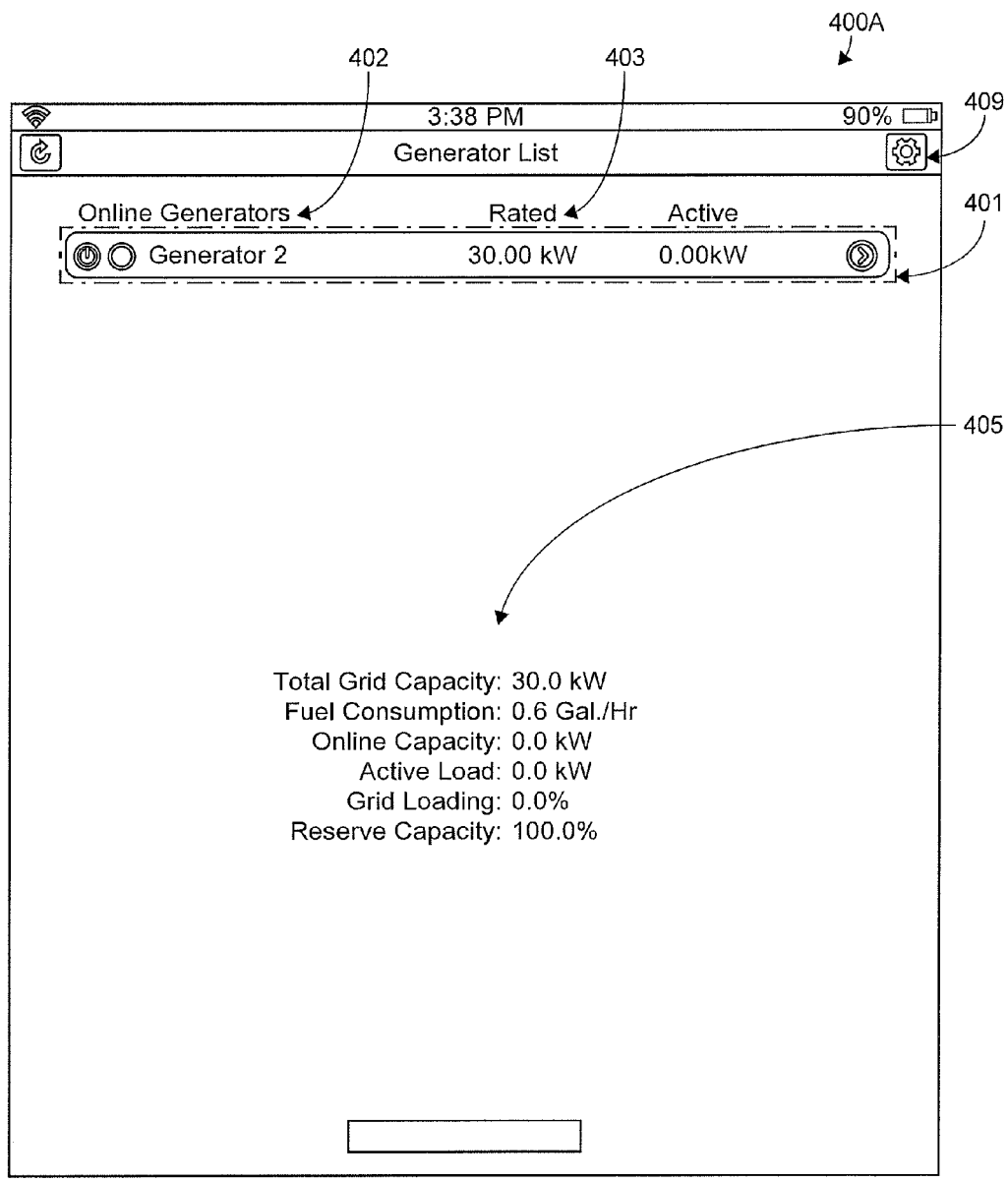
FIG. 4A depicts an example screen shot of display for monitoring power generators in a power grid according to one illustrative embodiment.

FIG. 4A depicts an example screen shot of display for monitoring power generators in a power grid. In the illustrated embodiment, a list 401 of online generators 402 is provided in a main screen 400A of an application for monitoring the microgrid. In this case, only generator 2 is powered on. Generator 2 is rated 403 at 30 KW in the illustrated embodiment. Additional performance characteristics 405 are also shown. Main screen 400A further includes a settings tab 409 which can be used, in at least certain embodiments, to drill down into further details of the operational characteristics of the generators connected to the grid.

Figure 4B:
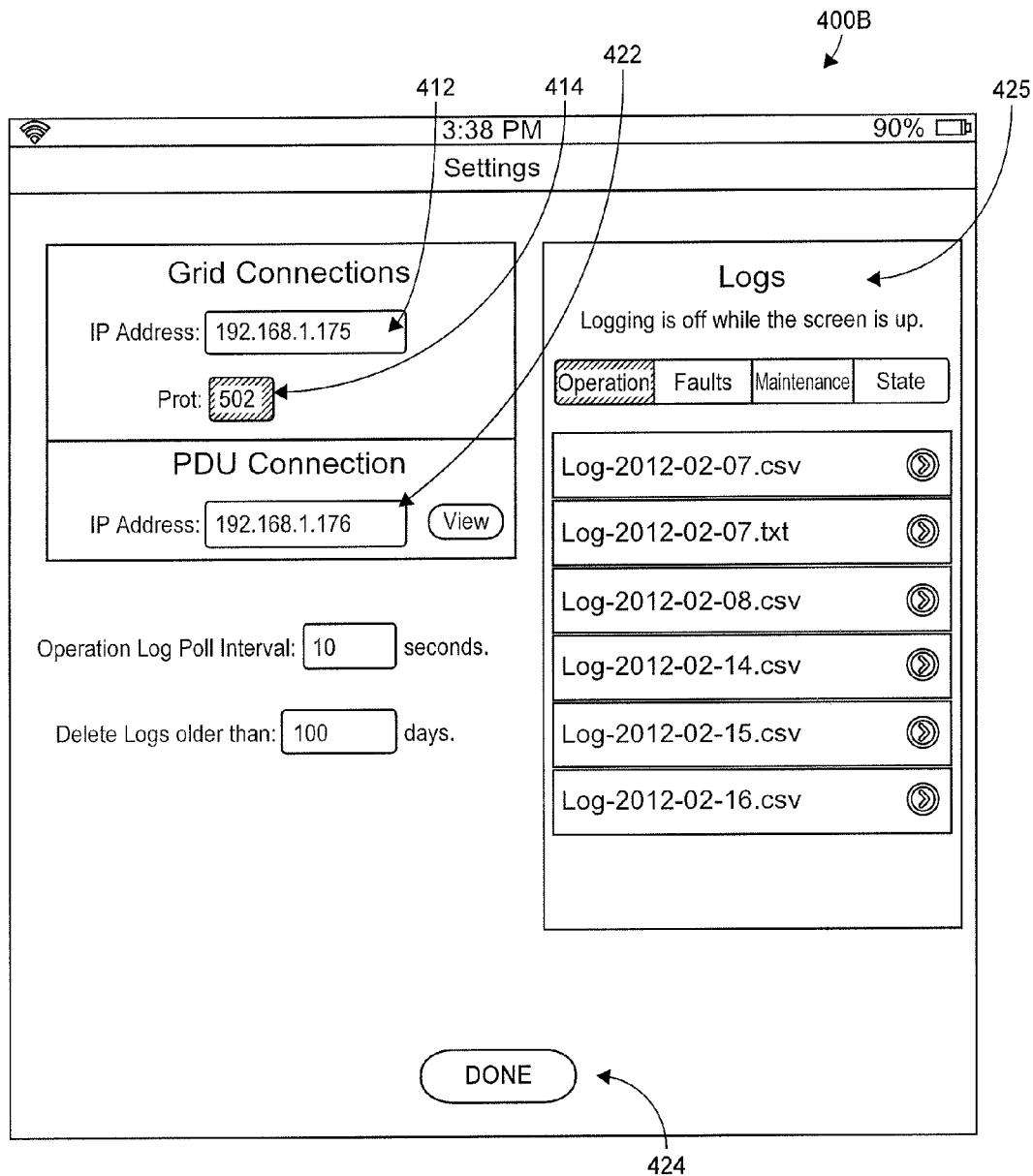
FIG. 4B depicts an example screen shot of display for accessing power generators in a power grid according to one illustrative embodiment.

FIG. 4B depicts an example screen shot of display for accessing power generators in a power grid. In the illustrated embodiment, settings display screen 400B includes a field 412 for users to type in the IP address of the power grid to access it over a network using the user's data processing device. In this example, the power grid is located on a network port 414 of the PDU designated as port 502. A field 422 is also provided for users to type in the IP address of the PDU to access it over a network as well. Settings display screen further includes a list of log files 425 that have been previously received from the grid and stored in the PDU.

Figure 4C:
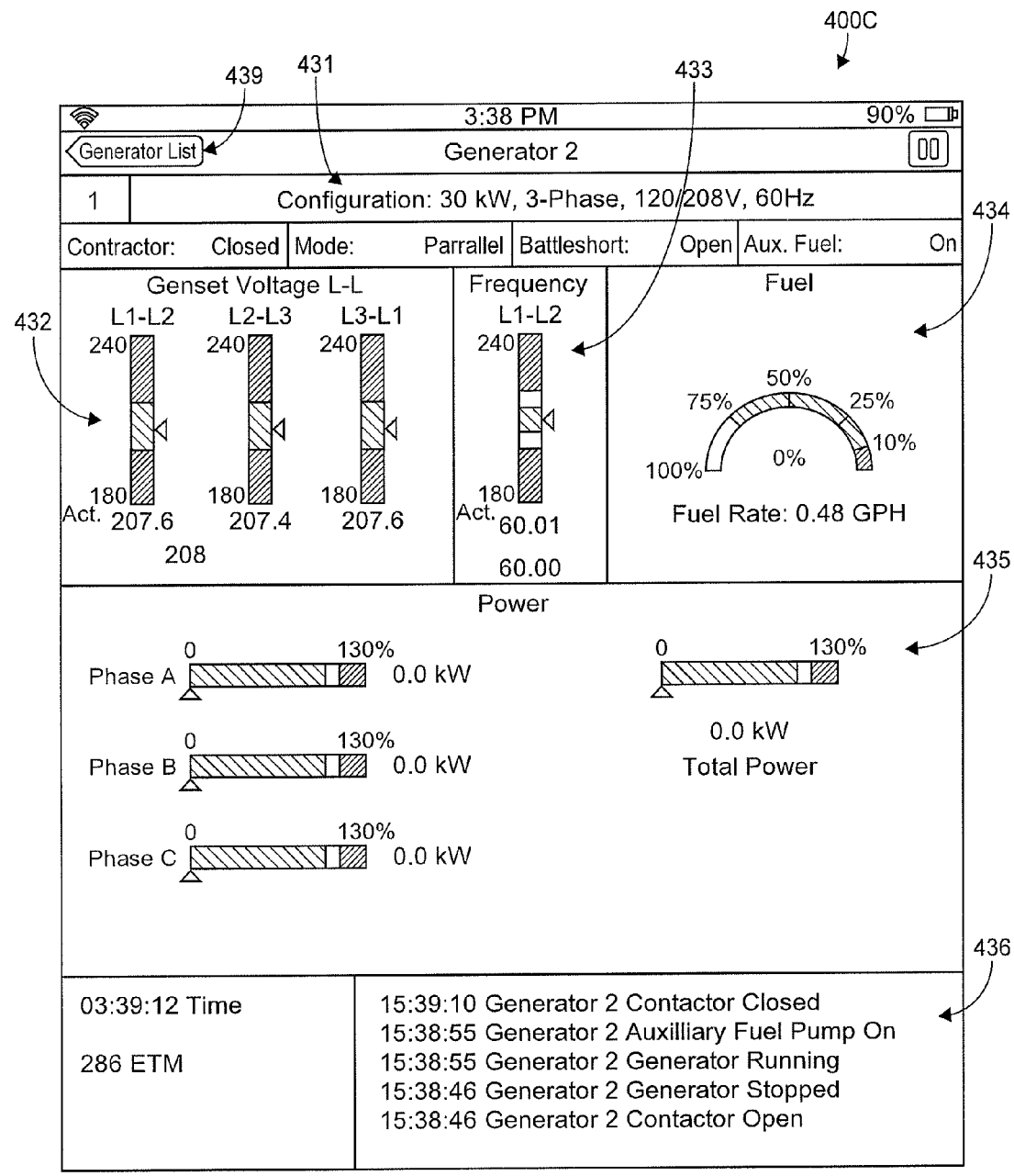
FIG. 4C depicts an example screen shot of display showing the operational characteristics of a power generator in a power grid according to one illustrative embodiment.

FIG. 4C depicts an example screen shot of display showing the operational characteristics of a power generator in a power grid. In the illustrated embodiment, display screen 400C includes configuration information 431 for one of the generators in the grid. Such detailed information, including operational data, includes (1) the three-phase voltage 432 of the particular generator, (2) the operating frequency 433, (3) fuel level 434 (e.g., gas, diesel, propane, etc.), (4) total power generated 435 (as well as power generated for each phase), and (5) a listing of log files 436 that have been previously obtained from the grid and stored in the PDU. Display screen 400C further includes a tab 439 to navigate back up the list of generators.

Figure 4D:
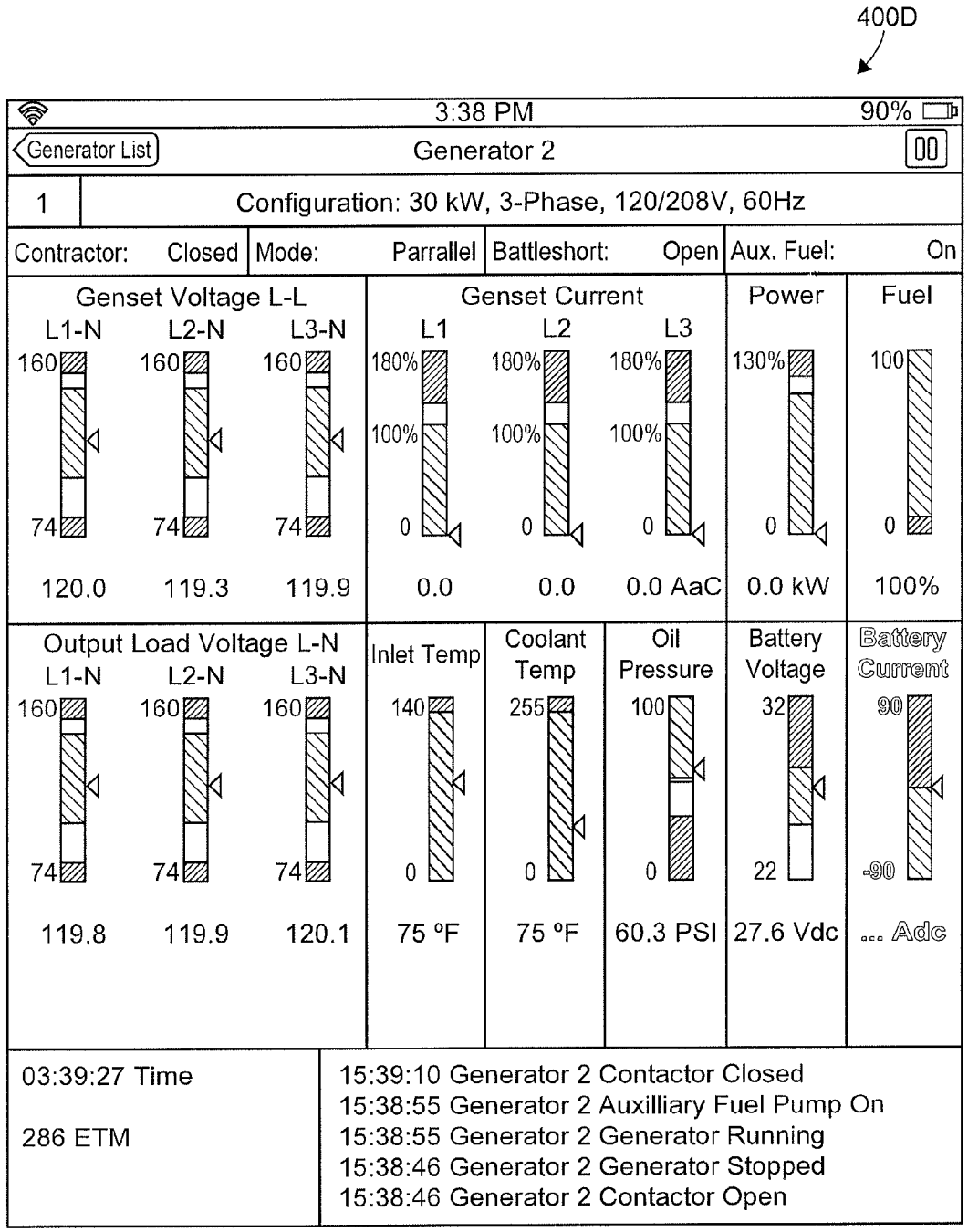
FIG. 4D depicts a second example screen shot of display showing additional operational characteristics of a power generator in a power grid according to one illustrative embodiment.

FIG. 4D depicts a second example screen shot of display showing additional operational characteristics of a power generator in a power grid. Other operational data can also be displayed including, but not limited to: (1) which generators are running, which are not; (2) which contactors are supplying power as well as the quantity of power; (3) how much power each generator is contributing to the power grid; (4) the water temperature in the generator radiators; (5) the oil pressure of the generators; (6) systems faults and warnings during operation; (7) the amount of total power available on the power grid; (8) the percentage load on the grid; (9) which generators are contributing to the load and which are not; (10) the total number of hours a generator has been running; (11) overall grid performance including a sum total of all generators; and (13) any real-time or snapshots of the performance of the generator or power grid.

II. Integrated Power and Safety Cable

Generally, multiple generators or generator sets ("gensets") are not directly connected together without some protection device that protects users or equipment from shock hazards. In conventional systems where there is no backup or redundant power generator, two generators can be connected together in parallel where each have both a power cable and a contactor interlock cable (safety cable) for each of the generators. In these conventional two-generator systems, killing the power in one generator would be safe since the contactor interlock cable is disconnected and the power could not back feed through to the generator that was powered down. But in power grids with multiple generators and distributed architectures (e.g., micro-grid arrays), there can be, for example, situations where four generators are running and a fifth is shut down. In these cases, since all five of the power output cables of the five generators are coupled together via a shared cable to drive the electrical load, power can feedback from the generators that are running through the shared power output cable and can back feed into the power output cable of the fifth generator that was shut down. This can present an electrocution hazard since power is still present on the connector due to a misconnected cable.

In some embodiments, the PDU is configured to combine the outputs of all the microgrid connected generators while providing a safe way to disconnect any one generator from the grid for service. This contrasts with conventional systems, which can require that entire networks (e.g., micro-grid arrays) be shut down to disconnect one generator from the grid for servicing. The PDU described herein is designed with connectors and cables configured to connect to one or more gensets together and can include internal disconnects (e.g., decouplers) to automatically disconnect the power at power output cables to provide for safe removal of one or more generators from the power grid without having to power down the grid. To do this, in at least certain embodiments, the PDU includes generator isolation control where the power output cable and the safety cable are the same cable. This system prevents accidental faulty wiring of a safety circuit in the system that could result in electrocution hazards. Certain embodiments further include failsafe contactor position light-emitting diodes ("LEDs") or other equivalent indicators to alert users to warn against live voltage on inputs and prevent hazards from failed contactors.

In some cases, a disconnect relay is configured to disconnect the power to the power output cable of one or more generators in the grid while the remaining generators on the grid are still active. For instance, a micro-grid array may have five generators connected to a PDU, where each one of the generators has an output power cable. Each generator can further include five more cables coming for a protected relay via an interlock cable. But a problem can arise where the power cables and interlock cables can look the same and a person could easily mistake one cable for the other such that the protective device may not be connected to the same input that the intended generator is connected to. In such a scenario, the protection device may be rendered useless because it may be controlled from the wrong generator, thus creating an electrocution hazard. As a result, although the generator power cable may be shut down, the contactor cable can still be powered.

The techniques described herein resolve this problem in at least certain embodiments by embedding the safety wire in the same cable (or cable connector) as the power cables used to output power to the electrical load. Essentially, the control for the protection device can be combined with the power output cable for the generator making it is impossible that the protection device and the generator will be connected together improperly because both features are incorporated into one cable. In another embodiment, the PDU includes an automatic disconnect contactor that electrically disconnects a power output cable from the generator when the generator is shut down without requiring manual switches, controls, or the like. This configuration provides a failsafe system that ensures that, when a particular generator is off, the contactor at the remote PDU is also disabled and the power cable is disabled from the PDU back to the generator, which, for all practical purposes, eliminates the risk of electrocution.

Other novel features of the contactor/power cable system include a lower weight than competing units, improved design of handles that are also used for securing cables, legs that allow for release from muddy surfaces, better impact protection, and failsafe contactor position LEDs that prevent hazards from failed contactors by warning against live voltages on inputs.

Provided below is a description of an illustrative data processing system in which embodiments provided herein may be implemented and utilized. Although some of the entities may be depicted as separate components, in some instances one or more of the components may be combined into a single device or location (and vice versa). Similarly, although certain functionality may be described as being performed by a single entity or component within the system, the functionality may, in some instances, be performed by multiple components or entities (and vice versa). Communication between entities and components may include the exchange of data or information using electronic messages on any suitable electronic communication medium as described below. As will be appreciated by one of ordinary skill in the art, these systems may have only some of the components described below, or may have additional components.

Figure 5:
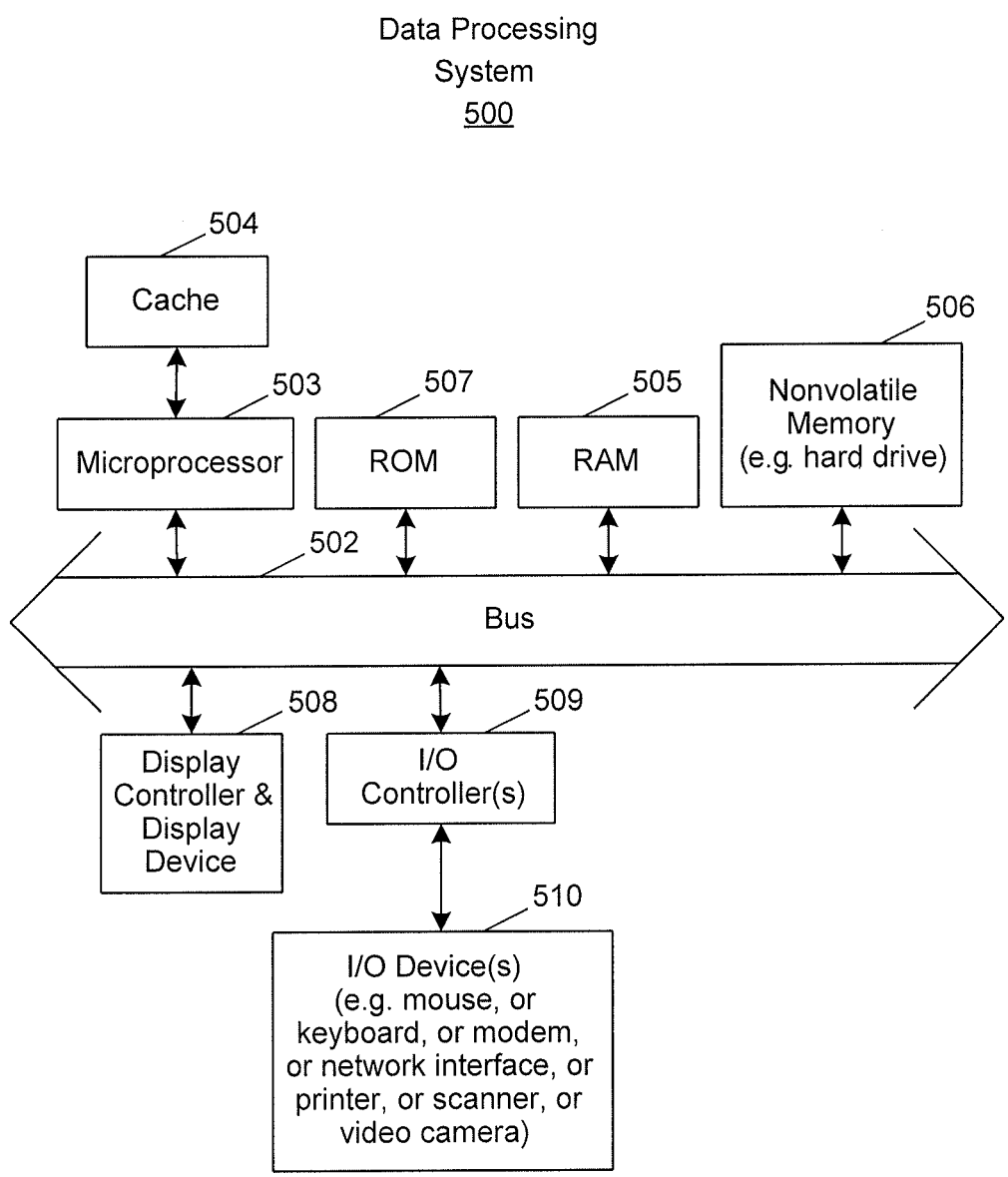
FIG. 5 depicts an example block diagram of a data processing system upon which the disclosed embodiments may be implemented in certain embodiments.

FIG. 5 depicts an example block diagram of a data processing system upon which the disclosed embodiments may be implemented in certain embodiments. Embodiments may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 5 shows one example of a data processing system, such as data processing system 500, which may be used with the present described embodiments. Note that while FIG. 5 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 5 may, for example, a personal computer (PC), workstation, tablet, smartphone or other hand-held wireless device, or any device having similar functionality.

As shown, the data processing system 501 includes a system bus 502 which is coupled to a microprocessor 503, a Read-Only Memory (ROM) 507, a volatile Random Access Memory (RAM) 505, as well as other nonvolatile memory 506. In the illustrated embodiment, microprocessor 503 is coupled to cache memory 504. System bus 502 can be adapted to interconnect these various components together and also interconnect components 503, 507, 505, and 506 to a display controller and display device 508, and to peripheral devices such as input/output ("I/O") devices 510. Types of I/O devices can include keyboards, modems, network interfaces, printers, scanners, video cameras, or other devices well known in the art. Typically, I/O devices 510 are coupled to the system bus 502 through I/O controllers 509. In one embodiment the I/O controller 509 includes a Universal Serial Bus ("USB") adapter for controlling USB peripherals or other type of bus adapter.

RAM 505 can be implemented as dynamic RAM ("DRAM") which requires power continually in order to refresh or maintain the data in the memory. The other nonvolatile memory 506 can be a magnetic hard drive, magnetic optical drive, optical drive, DVD RAM, or other type of memory system that maintains data after power is removed from the system. While FIG. 5 shows that nonvolatile memory 506 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A power grid array comprising:
   a plurality of generators, wherein each of the plurality of generators includes an interlock output and a load output;
   a plurality of power output cables, each being associated with a corresponding generator of the plurality of generators, wherein:
      each of the plurality of power output cables includes a safety wire and a load line;
      the safety wire of each of the plurality of power output cables is connected to the interlock output of the corresponding generator; and
      the load line of each of the plurality of power output cables is connected to the load output of the corresponding generator;
   a power distribution unit including a plurality of inputs, wherein:
      each of the plurality of inputs is connected to a corresponding power output cable of the plurality of power output cables; and
      the power distribution unit includes an automatic disconnect contactor operable to electrically disconnect the load line of the corresponding power output cable from the corresponding generator when the corresponding generator is shut down.

2. The power grid array of claim 1, wherein the plurality of generators share an overall electrical load of the power grid array.

3. The method of claim 2, wherein the overall electric load is balanced among the plurality of generators in the power grid array, and wherein one or more of the generators in the power grid array are automatically shut down based on the overall electrical load.

4. The power grid array of claim 1, wherein each of the plurality of generators further includes a controller and a battery, wherein the battery provides DC power to the controller from a DC power connector using a DC power receptacle, and wherein each DC power connector is coupled to one or more other DC power connectors of other generators of the plurality of generators.

5. The power grid array of claim 4, wherein the DC power connectors are coupled together in a daisy-chain fashion.

6. The power grid array of claim 4, wherein the DC power connectors provides power to the power distribution unit and charges batteries of idle generators.

7. The power grid array of claim 1, wherein each of the plurality of generators further includes a controller and a digital receptacle, wherein the digital receptacle receives one or more digital signals to communicate data and one or more control signals among and between the plurality of generators.

8. The power grid array of claim 7, wherein the digital receptacles are coupled together in a daisy-chain fashion.

9. The power grid array of claim 8, wherein one of the digital receptacles is coupled to a control input of the power distribution unit using a digital paralleling cable.

10. The power grid array of claim 1, wherein the plurality of generators are automatically synchronized in the power grid array.

11. The power grid array of claim 1, wherein one or more of the generators remain operational while the generator is shut down.

12. The power grid array of claim 1, wherein the load line of the corresponding power output cable is still coupled to the corresponding generator when electrically disconnected by the automatic disconnect contactor, and wherein the automatic disconnect contactor is controlled using the safety wire.

13. A method of operating a power grid array including a plurality of generators and a power distribution unit, the method comprising:
- providing the plurality of generators, each generator including a load output and an interlock output;
- providing the power distribution unit, wherein the power distribution unit includes a plurality of inputs, each input coupled to an automatic disconnect contactor;
- providing a plurality of power output cables, each power output cable associated with a corresponding generator of the plurality of generators and a corresponding input of the plurality of inputs, wherein each of the plurality of output cables includes a safety wire and a load line;
- for each of the plurality of power output cables:
  - connecting a first end of the load line to the load output of the corresponding generator;
  - connecting a second end of the load line to the corresponding input of the power distribution unit;
  - connecting a first end of the safety wire to the interlock output of the corresponding generator; and
  - connecting a second end of the safety wire to the automatic disconnect contactor coupled to the corresponding input, wherein the automatic disconnect contactor is operable to electrically disconnect the second end of the load line when the corresponding generator is shut down.

14. The method of claim 13, wherein the one or more current generators share an overall electrical load of the power grid array.

15. The method of claim 13, wherein the overall electric load is balanced among the one or more current generators in the power grid array, and wherein one or more of the current generators in the power grid array are automatically shut down based on the overall electrical load.

16. The method of claim 13, further comprising:
coupling a line from a current generator of the one or more current generators to the new generator, wherein the line is coupled to the current generator using a first DC power connector, wherein the new generator further includes a controller, a battery, and a second DC power connector, and wherein the battery provides DC power to the controller from the second DC power connector using the line.

17. The method of claim 16, wherein the second DC power connector provides power to the power distribution unit and charges batteries of one or more idle generators of the one or more current generators.

18. The method of claim 13, further comprising:
coupling a digital receptacle to a control input of the power distribution unit using a digital paralleling cable, wherein the new generator further includes a controller and the digital receptacle, wherein the digital receptacle receives one or more digital signals to communicate data and one or more control signals among and between the one or more current generators.

19. The method of claim 13, wherein the one or more of current generators are automatically synchronized in the power grid array.

20. The method of claim 13, wherein one or more of the current generators remain operational when the new generator is shut down.

* * * * *